(12) United States Patent
Adamic et al.

(10) Patent No.: US 6,540,821 B2
(45) Date of Patent: Apr. 1, 2003

(54) INKJET COLOR INK SET

(75) Inventors: Raymond J Adamic, Corvallis, OR (US); Mary E Austin, Corvallis, OR (US); Hiang P Lauw, Corvallis, OR (US); Dennis P Parazak, Oceanside, CA (US); Zia Rehman, Corvallis, OR (US)

(73) Assignee: Hewlett-Packard Company, Palo Alto, CA (US)

( * ) Notice: Subject to any disclaimer, the term of this patent is extended or adjusted under 35 U.S.C. 154(b) by 134 days.

(21) Appl. No.: 09/848,810

(22) Filed: May 4, 2001

(65) Prior Publication Data

US 2003/0015120 A1 Jan. 23, 2003

(51) Int. Cl.$^7$ ............................................. C09D 11/02
(52) U.S. Cl. ............................... 106/31.48; 106/31.27; 106/31.49
(58) Field of Search .................... 106/31.48, 31.49, 106/31.27

(56) References Cited

U.S. PATENT DOCUMENTS

| | | | |
|---|---|---|---|
| 5,143,547 A | 9/1992 | Kappele | 106/31.27 |
| 5,145,519 A | 9/1992 | Kappele | 106/31.27 |
| 5,428,383 A | 6/1995 | Shields et al. | 347/96 |
| 5,560,766 A * | 10/1996 | Gundlach | 106/31.27 |
| 5,749,951 A * | 5/1998 | Yoshiike et al. | 106/31.27 |
| 5,772,742 A | 6/1998 | Wang | 106/31.27 |
| 5,858,075 A | 1/1999 | Dearduff et al. | 106/31.27 |
| 6,033,064 A | 3/2000 | Pawlowski, Jr. et al. | 347/85 |
| 6,053,969 A | 4/2000 | Lauw et al. | 106/31.27 |
| 6,059,868 A | 5/2000 | Kasperchik | 106/31.27 |
| 6,120,589 A | 9/2000 | Bannai et al. | 106/31.27 |
| 6,149,722 A * | 11/2000 | Robertson et al. | 106/31.49 |
| 6,234,601 B1 * | 5/2001 | Hayashi et al. | 347/16 |
| 2002/0005884 A1 * | 1/2002 | Onishi et al. | 347/100 |

* cited by examiner

Primary Examiner—Helene Klemanski

(57) ABSTRACT

Color ink sets for use in printer systems are provided and formulated to provide improved plain paper and special media performance while maintaining good printing characteristics. The inks and ink sets of the present invention exhibit excellent color performance and lightfastness across a range of media, robust K/Y bleed resistance on plain paper at fast print speeds, as well as excellent printability and reliability. A specific dye set for formulating yellow, magenta, and cyan inks comprises a mixture of acid yellow 23 (AY23) and direct yellow 132 (DY132), a mixture of a cyan dye compound having the formula:

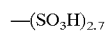

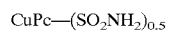

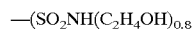

wherein Pc represents a phthalocyanine nucleus and acid blue 9; and a magenta dye compound having formula:

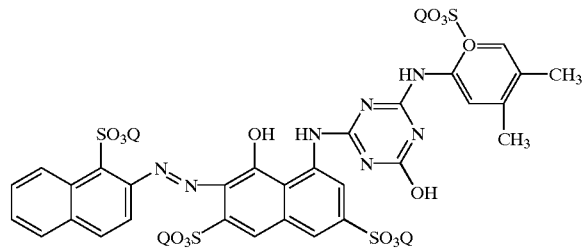

wherein Q is a cation.

18 Claims, No Drawings

INKJET COLOR INK SET

FIELD OF THE INVENTION

The present invention generally relates to ink-jet printing, and in particular, to a specific ink set suitable for use with an off-axis printer system.

BACKGROUND OF THE INVENTION

Ink-jet printing is a non-impact printing process in which droplets of ink are deposited on a print medium in a particular order to form alphanumeric characters, area-fills, and other patterns thereon. Low cost and high quality of the hardcopy output, combined with relatively noise-free operation, have made ink-jet printers a popular alternative to other types of printers used with computers. One particular type of ink-jet printer, known as an off-axis printer, includes a replaceable print cartridge A fluid interconnect on the print cartridge connects it to a separate ink supply located within the printer.

The non-impact printing process of ink-jet printing involves the ejection of fine droplets of ink onto a print medium such as paper, transparency film, or textiles in response to electrical signals generated by a microprocessor. There are two basic means currently available for achieving ink droplet ejection in ink-jet printing: thermally and piezo-electrically. In thermal ink-jet printing, the energy for drop ejection is generated by electrically heated resistor elements, which heat up rapidly in response to electrical signals from a microprocessor to create a vapor bubble, resulting in the expulsion of ink through nozzles associated with the resistor elements. In piezoelectric ink-jet printing, the ink droplets are ejected due to the vibrations of piezoelectric crystals, again, in response to electrical signals generated by the microprocessor.

Commercially-available off-axis ink-jet printers, such as a DeskJet® 2200 printer available from Hewlett-Packard Company, use inks of differing hues, namely, magenta, yellow, and cyan, and optionally black. The particular set of colorants, for example, dyes, used to make the inks is called a "primary dye set." A spectrum of colors, e.g., secondary colors, can be generated using different combinations of the primary dye set.

Any given perceived color can be described using any one of the color spaces, as is well known in the art. For example, in the CIELAB color space, a color is defined using three terms L*, a*, and b*. L* defines the lightness of a color, and it ranges from zero (black) to 100 (white). The terms a* and b*, together, define the hue and chroma characteristics of a given color. The term a* ranges from a more negative number, green, to a more positive number, red. The term b* ranges from a more negative number, blue, to a more positive number, yellow.

To determine the concentration or amount of a given substance (e.g., a dye) in a solution, absorbance is commonly used by chemists. Many molecules and ions have the ability to absorb visible light. When these ions or molecules are present in solution, the amount of light absorbed is directly related to the number of molecules in solution. Each ion or molecule will have characteristic absorption spectra wherein the various wavelengths of light present in visible "white" light are differentially absorbed. It is desirable in most cases to measure the absorbance where the absorbance is strongest ($lambda_{max}$) or most sensitive. Absorbance values can be calculated according to Beers Law:

Absorbance=Ebc where a. E is equal to molar absorptivity which is an intrinsic property of the molecule
b. b is equal to the path length the light must travel
c. c is equal to the solution concentration The resulting absorbance value can then be applied to determine the concentration of molecules. In the case of dyes, the absorbance is taken as the measure of concentration or amount of dye molecules present, just as weight would be used if dry material were used. In the manufacture of inks using dyes, it is desirable to use absorbance due to the expense associated in drying dyestuffs for the sole purpose of measuring the same by dry weight and redissolving them. There are health hazards associated with handling dried dye that require expensive safety procedures to be implemented and, often times, the raw dye from the manufacturer is not 100% pure, creating further problems. When working with a dyestuff that is not 100% pure, dry weight of dye is actually misleading as a given dry weight of dye could contain a variable number or concentration of dye molecules dependant on the purity, which are the functional element in the ink. By using absorbance as a measure of dye concentration the accurate reproducible manufacture of inks using dyes is assured.

In general, a successful ink set for color ink-jet printing must have the following properties: good crusting resistance, good stability, the proper viscosity, the proper surface tension, good color-to-color bleed alleviation, rapid dry time, consumer-safety, and low strike-through. When placed into a thermal ink-jet system, the ink set must also be kogation-resistant.

In addition, the ink set must be able to provide printed images having good color characteristics, such as correct hue and high chroma. While formation of colors on plain paper is required, it is also necessary that the ink set be useful on other print media, such as transparency film, coated paper, and photo paper. Another requirement for the ink set is to provide a hard copy output that is lightfast, thus preserving the integrity of the original color information.

While some of these conditions may be met by ink vehicle design, other conditions must be met by the proper selection and combination of the colorants. The selection of the colorants becomes especially important when additional limitations are placed on the choice of the colorants because of other system requirements, such as the color-to-color bleed control mechanism.

Regardless of whether an ink is dye-based or pigment-based, ink-jet inks commonly face the challenge of color-to-color or black-to-color bleed control. The term "bleed," as used herein, is defined to be the invasion of one color into another, once the ink is deposited on the print medium, as evidenced by a ragged border of mixed color therebetween. Bleed occurs as colors mix both on the surface of the paper substrate as well as within the substrate itself. The occurrence of bleed is especially problematic between a black ink and an adjacently-printed color ink because it is all the more visible. Hence, to achieve good print quality, bleed must be substantially reduced or eliminated such that borders between colors are clean and free from the invasion of one color into the other.

Many proposals are made to obtain high quality ink compositions for ink-jet printing which attempt to meet the above-mentioned characteristics. Although various inks are known which possess one or more of the of the foregoing properties, few inks possess all of these properties, since an improvement in one property often results in the degradation of another property. For example, to obtain improved color reproduction performance, U.S. Pat. No. 5,143,547 discloses the combination of C.I. Acid Yellow 23, C.I. Direct Red 227, and C.I. Acid Blue 9; while U.S. Pat. No. 5,145,519 discloses the combination of C.I. Direct yellow 86, C.I. Acid Red 52, and C.I. Acid Blue 9. These sets of ink compositions, however, possess a number of shortcomings. For example, the C.I. Yellow 23 for use in the yellow ink composition disclosed in U.S. Pat. No. 5,143,547 has poor light resistance.

A different approach used for controlling bleed between the printed images, as disclosed in U.S. Pat. No. 5,428,383, is to provide a first ink composition comprising a first colorant, and a second ink composition comprising a second colorant and a precipitating agent (e.g., inorganic salts), which will react with the first colorant in the first ink composition so that upon contact of the first ink and the second ink on the printing medium a precipitate is formed, thus preventing color bleed between the first ink composition and the second ink composition.

Likewise, many inks used commercially represent a compromise in an attempt to achieve an ink evidencing at least an adequate response in each of the aforementioned characteristics. For example, a number of inks and ink sets suffer from black to color bleed which make their use less desirable or impossible for a number of color-intensive printing applications. Likewise, many of the known inks and ink sets suffer from poor lightfastness and humid hue shift/bleed on special media. Other problems are encountered when attempting to use these known inks and ink sets in reservoir based off-axis printing systems. In view of the foregoing, there exists a need in the industry for inks that work well in both fiber and foam based off-axis systems as well as in pens/cartridges without any fiber or foam material, and for ink formulations which have improved properties and which do not improve one property at the expense of the others, such as image quality, light fastness, architecture, performance and reliability. More specifically, there exists a need for improved black-to-yellow (K/Y) bleed for faster plain paper printing, no humid hue shift/bleed for magenta inks on special media, good plain paper chroma and lightfastness, and/or compatibility of inks with new reservoir material in an ink supply (e.g., as seen in off-axis system cartridges)

SUMMARY OF THE INVENTION

Color ink sets suitable for use in ink-jet printers are provided. In accordance with the invention, a set of color inks for use in printer systems are provided and formulated to provide improved plain paper and special media performance while maintaining good printing characteristics. The inks and ink sets of the present invention exhibit excellent color performance and lightfastness across a range of media, robust K/Y bleed resistance on plain paper at fast print speeds, as well as excellent printability and reliability. Furthermore, the ink set enables good reliability in an environment having a relatively high concentration of precipitating agents. This reliability enables the use of precipitation bleed control mechanisms. The inks and ink sets of the present invention also work equally well in a synthetic fiber or foambased (e.g., polyurethane foam) or a fiberless (foamless) system.

More specifically, a specific dye set for formulating yellow, magenta, and cyan inks is disclosed, a yellow dye comprising a mixture of acid yellow 23 (AY23) and direct yellow 132 (DY132), a cyan dye comprising a mixture of acid blue 9 (AB9) and a cyan dye compound having the formula:

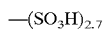

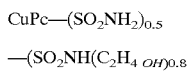

—(SO$_2$NH(C$_2$H$_4$ $_{OH}$)$_{0.8}$ wherein Pc represents a phthalocyanine nucleus (as disclosed in Patent Application No. WO 99/67334, the contents of which are incorporated herein by reference); and a magenta dye comprising a magenta dye compound having formula:

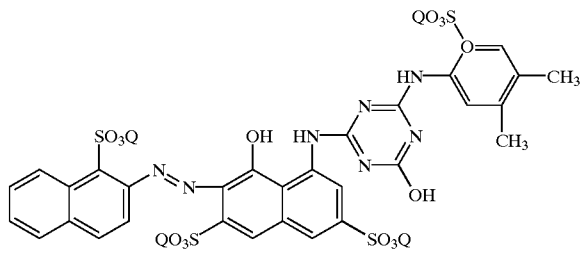

wherein Q is a cation.

DETAILED DESCRIPTION OF THE INVENTION

The invention described herein is directed to a specific ink set for printing ink-jet images using commercially available ink-jet printers, such as DESKJET®® printers, and more particularly, off-axis ink-jet printers, such as the DESKJET 2200® printer, manufactured by Hewlett-Packard Company of Palo Alto, Calif. The ink set enables an ink-jet color printer to produce high quality color images having excellent color performance and lightfastness on a range of media, particularly on plain paper. Furthermore, the ink set enables good reliability, such as ink stability, and decap and recovery (e.g. crusting) in a variety of environments.

The present yellow, magenta, and cyan aqueous ink compositions each comprise in general from about 0.05 to about 20 wt % of at least one dye and a vehicle comprising the following components (in wt % of total ink composition): from about 5 to about 30 wt % of at least one organic solvent; 0 to about 5 wt % of at least one component independently selected from the group consisting of surfactants, buffers, precipitating agents and biocides. All concentrations herein are in weight percent of total ink composition, unless otherwise indicated. The purity of all components is that employed in normal commercial practice for ink-jet inks. In the practice of the invention, each ink color, namely, yellow, magenta, and cyan can comprise more than one dye load. That is, there can be one or more ink-jet ink supplies filled for each ink color, each supply having a different dye load or a different dye. As used herein, the term "ink" refers to the inks of the present invention.

Colorant

In selecting the colorants for the ink set of the present invention, the following factors were considered: reduced or absence of humid hue shift; good color performance, particularly, on plain paper; good lightfastness; good black to color bleed resistance; excellent printability and readability; and compatibility of inks with reservoir fiber-based materials in the ink supply. Of particular importance in the present invention was the selection of appropriate colorants capable of providing the aforementioned characteristics in a reservoir-based off-axis printer, as well as providing those attributes in a printer or pen lacking such a fiber material.

In order to achieve the above-mentioned goals, the dyes or colorants selected for the present ink set should exhibit good compatibility (e.g., stable in the ink vehicle) in various environments. For example, the selected colorants should exhibit little, if any, significant reactivity with precipitating agents when these two materials (i.e., colorant and precipitating agent) are formulated in the same ink and should remain soluble when formulated with a precipitating agent. In other words the dyes should have sufficient solubility in the ink vehicle so that they would not form unwanted levels of precipitate by the precipitating agents or through reaction with other components in the ink. Additionally, the dyes should not react with the precipitant to form unwanted levels of compounds that will, either immediately or over time, drop out of solution. For example the dyes should not form insoluble complexes or salts that have a tendency to form aggregates that have decreased solubility in the ink vehicle over time in such levels as to interfere with the desired performance of the printing system.

The selected colorants must also exhibit good lightfastness on a wide range of media, particularly, special paper. It is also important that the colorants produce highly chromatic printed images having the appropriate hue, especially on plain paper.

It was found that many of the dyes that satisfied the first two requirements, namely, good solubility and lightfastness, produced printed images that (1) deviated from the ideal hue angle targets on plain paper, and/or (2) had low chroma on plain paper.

The dye set of the present invention, provides good color gamut on plain paper; good lightfastness; improved K/Y bleed, good pH stability, and good printing performance. The ink set of the present invention comprises:

a yellow ink comprising a mixture of acid yellow 23 (AY23) and direct yellow 132 (DY132);

a cyan ink comprising a mixture of acid blue 9 (AB9) and a cyan dye compound having the formula:

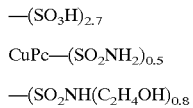

wherein Pc represents a phthalocyanine nucleus; and a magenta ink comprising a magenta dye having the formula:

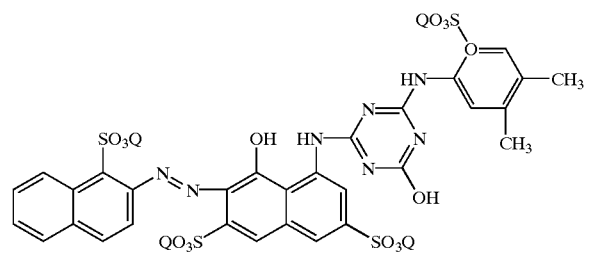

wherein Q is a cation. In a preferred embodiment, Q is independently selected the group of cations consisting of ammonium, substituted ammonium, sodium, lithium, potassium, and tetramethylammonium ion.

The inks of the present invention comprise from about 0.05 to about 20% dye; preferably, from about 0.1 to about 8%; and more preferably, from about 0.5 to about 5%; by weight, based on the total weight of the ink, based on the sodium form of the dyes. It should be understood that the actual salt form of the dye used in the ink may be different (e.g., the dye may be in the TMA form). The dyes may be in their salt form, such as an alkali metal (Na, K, or Li) or quaternary ammonium. Some of these salt forms, such as Na, are commercially available. Other salt forms can be made using well known techniques.

In one embodiment, the inks of the present invention comprise: at least one yellow ink having a visible light absorbance of from about 0.242 to about 0.620 at a lambda$_{max}$ of from 404 to 412 and at a 1:5,000 dilution in water; at least one cyan ink having a visible light absorbance of from about 0.08 to about 1.55 at a lambda$_{max}$ of from 624 to 632 and at a 1:5,000 dilution in water; at least one magenta ink having a visible light absorbance of from about 0.020 to about 0.807 at a lambda$_{max}$ of from 540 to 550 and at a 1:10,000 dilution in water. In a more preferred embodiment the inks of the present invention comprise: at least one yellow ink having a visible light absorbance of from about 0.299 to about 0.451 at a lambda$_{max}$ of from 404 to 412 and at a 1:5,000 dilution in water; at least one cyan ink having a visible light absorbance of from about 0.16 to about 0.80 at a lambda$_{max}$ of from 624 to 632 and at a 1:5,000 dilution in water; at least one magenta ink having a visible light absorbance of from about 0.061 to about 0.404 at a lambda$_{max}$ of from 540 to 550 and at a 1:10,000 dilution in water. In a most preferred embodiment, the inks of the present invention comprise: at least one yellow ink having a visible light absorbance of from about 0.348 to about 0.404 at a lambda$_{max}$ of from 404 to 412 and at a 1:5,000 dilution in water; at least one cyan ink having a visible light absorbance of from about 0.335 to about 0.400 at a lambda$_{max}$ of from 624 to 632 and at a 1:5,000 dilution in water; at least one magenta ink having a visible light absorbance of from about 0.150 to about 0.170 at a lambda$_{max}$ of from 540 to 550 and at a 1:10,000 dilution in water.

Additional Components

Consistent with the requirements for this invention, various types of additives, as is commonly practiced in the art, may be employed in the inks to optimize the properties of the ink compositions for specific applications.

Precipitating Agent

Precipitating agents may be used to further enhance the characteristics of the ink set of the present invention. The precipitating agent is preferably of a type which upon contact (for example on the print medium) reacts with the anionic group (e.g., the anionic group such as carboxyl or sulfonate) associated with a colorant (such as a dye, or a self-stabilized pigment, or the ionic group on a dispersant associated with a dispersed pigment) in the ink (i.e., second ink) composition to form an insoluble salt, complex, or compound.

Vehicle

The inks of the present invention comprise an aqueous vehicle comprising the following components (in wt % of total ink composition): from about 5 to about 30 wt % of at least one water soluble organic solvent; 0 to about 5 wt % of at least one component independently selected from the group consisting of surfactants, buffers, biocides, and metal chelators; and the balance water.

Organic Solvent

The inks of the present invention comprise from about 5 to about 35 wt % organic solvent. More preferably, the inks comprise from about 10 to about 30 wt % organic solvent, with a concentration from about 15 to about 25 wt % being the most preferred.

The water soluble organic solvents suitably employed in the present ink-jet ink compositions include any of, or a mixture of two or more, of such compounds as nitrogen-containing heterocyclic ketones, such as 2-pyrrolidone, N-methyl-pyrrolid-2-one (NMP), 1,3-dimethylimidazolid-2-one, and octyl-pyrrolidone; diols such as ethanediols, (e.g., 1,2-ethandiol), propanediols (e.g., 1,2-propanediol, 1,3-propanediol, 2-ethyl-2-hydroxy-methyl-1,3-propanediol, ethylhydroxy-propanediol), butanediols (e.g., 1,2-butanediol, 1,3-butanediol, 1,4-butanediol), pentanediols (e.g., 1,2-pentanediol, 1,5-pentanediol), hexanediols (e.g., 1,6-hexanediol, 2,5-hexanediol, 1,2-hexanediol), heptanediols (e.g., 1,2-heptanediol, 1,7-heptanediol), octanediols (e.g., 1,2-octanediol, 1,8-octanediol); glycol ethers and thioglycol ethers, commonly employed in ink-jet inks, such as polyalkylene glycols such as polyethylene glycols (e.g., diethylene glycol (DEG), triethylene glycol, tetraethylene glycol), polypropylene glycols (e.g., dipropylene glycol, tripropylene glycol, tetrapropylene glycol), polymeric glycols (e.g., PEG 200, PEG 300, PEG 400, PPG 400), and thiodiglycol.

Preferably, the organic solvent comprises 1,2 diols of $C_5$–$C_7$, namely, 1,2-pentanediol, 1,2-hexanediol, and 1,2-heptanediol; and most preferably, 1,5-pentanediol is employed in the practice of the invention.

Surfactant

The inks of the present invention optionally comprise 0 to about 10 wt % surfactant. More preferably, the inks comprise from about 0.5 to about 5 wt % surfactant.

In the practice of the invention, one or more surfactants may optionally be used. Non-ionic surfactants, such as secondary alcohol ethoxylates (e.g., Tergitol series available from Union Carbide Co.), non-ionic fluoro surfactants (such as FC170C available from 3M), non-ionic fatty acid ethoxylate surfactants (e.g., Alkamul PSMO-20 available from Rhone-Poulenc), and fatty amide ethoxylate surfactants (e.g., Aldamide L203 available from Rhone-Poulenc) are preferred, with secondary alcohol ethoxylates being the most preferred. In the practice of the invention, the secondary alcohol ethoxylates serve to prevent color to color bleed by increasing the penetration of the inks into the print medium. Secondary alcohol ethoxylates are nonionic surfactants and are commercially available, for example, from Union Carbide Co. (Houston, Tex.) as the Tergitol series. Tergitol 15-S-5 is the preferred surfactant.

The secondary alcohol ethoxylates contain (a) an aliphatic chain having a prescribed number of carbon atoms in the chain, and (b) a prescribed number of ethoxylated units. These ethoxylates are commercially available as mixtures of ethoxylates, and so are described in terms of the predominance of a given compound. Secondary alcohol ethoxylates suitably employed in the practice of the invention predominantly have from about 12 to about 18 carbon atoms in the aliphatic chain, while the number of ethoxylated units is predominantly in the range of from about 4 to about 8 units. Thus, "Tergitol 15-S-5" represents a secondary alcohol ethoxylate surfactant predominantly having about 15 carbons in its aliphatic chain and about 5 ethoxylated units. Tergitol 15-S-5 is the most preferred surfactant.

Buffer

The inks of the present invention optionally comprise 0 to about 1.5 wt % buffer. More preferably, the inks comprise from about 0.0 to about 0.5 wt % buffer, with a concentration from about 0.0 to about 0.3 wt % being the most preferred. Buffers employed in the practice of the invention to modulate pH can be organic-based. Examples of preferably-employed buffers include Trizma Base, available from companies such as Aldrich Chemical (Milwaukee, Wis.), 4-morpholinepropanesulfonic acid (MES), and 4-morpholinepropanesulfonic acid (MOPS). Buffers employed should provide a pH ranging from about 3 to about 9 in the practice of the invention, preferably about 3 to about 5 and most preferably from about 3.7 to 4.2.

Metal Chelator

The inks of the present invention optionally comprise 0 to about 1.5 wt % metal chelator. More preferably, the inks comprise from about 0.1 to about 0.5 wt % metal chelator, with a concentration from about 0.1 to about 0.3 wt % being the most preferred.

Metal chelators employed in the practice of the invention are used to bind transition metal cations that may be present in the ink. Examples of preferably-employed metal chelators include: Ethylenediaminetetraacetic acid (EDTA), Diethylenetriaminepentaacetic acid (DTPA), trans-1,2-diaminocyclohexanetetraacetic acid (CDTA), (ethylenedioxy) diethylenedinitrilotetraacetic acid (EGTA), or other chelators that can bind transition metal actions. More preferably, EDTA, and DTPA; and most preferably, EDTA in its disodium dihydrate salt form is employed in the practice of the invention.

Biocide

The inks of the present invention optionally comprise 0 to about 5 wt % biocide. More preferably, the inks comprise from about 0 to about 2 wt % biocide, with a concentration from about 0.0 to about 0.5 wt % being the most preferred. Any of the biocides commonly employed in ink-jet inks may be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250.

EXAMPLES

Inks were formulated and different qualities of the formulated inks were measured in an effort to assess the benefits attained in the practice of the invention, such as, architecture, reliability (including recovery), pH senitivity, K/Y bleed under various conditions, decap attributes, viscosity, bearding, kogation, humid hue shift/bleed, chroma, and lightfastness.

Print Sample Generation

Unless otherwise described, print samples of formulated inks, where necessary, were generated using Hewlett-Packard DeskJet® inkjet and off-axis printers, such as the DeskJet® 2200. The print media used included uncoated paper such as Gilbert Bond paper manufactured by Mead; and HP's photo glossy media for DeskJet®® Printers.

Example 1

Ink Optimization Experiments

Due to the complexity of various ink formulations, preliminary experiments were conducted to determine which specific components within the ink formulations affected ink performance sufficiently to warrant its inclusion in subsequent ink optimization experiments.

A number of variable ranges were determined in order to test ink performance. Dowfax 8390 (anionic surfactant avalailable from Dow chemical) was tested at a lower limit of 0% and at an upper limit of 5%. Surfactant (Mackam OCT50) was tested at a lower limit of 2% wt. to an upper limit of 5% wt. Succinic acid was tested at a lower limit of 0% and at an upper limit of 5%. Three solvents were tested: 1,5-pentanediol; 2-pyrrolidone (2-P); and tetraethyleneglycol (TEG). Because a change in the amount of solvent can affect the total organic content of the formulation, various mixtures containing all three of these solvents were designed and tested, with the total solvent content held constant. The pH of the formulations was tested at levels ranging from 3.5 to 4.2.

Stability and Reliability Determination

Inks were formulated and their stability was determined by accelerating the aging process by subjecting the ink samples to a number of variables, such as high temperature cycling, and thereafter evaluating the inks for print performance and unwanted precipitation. The inks were supplied to inkjet printheads and used to generate print samples. The amount of printhead servicing (such as spitting, wiping, and priming) that was required to keep the printheads from having any adverse impact on image quality (because of missing or misdirected nozzles due to, for example, crusting or bearding) was determined.

A preferred vehicle formulation for the yellow ink composition is as follows:

TABLE I

| Component | Wt. % |
|---|---|
| Alkyl diol | 8 to 16 |
| Heterocyclic ketone | 0 to 6 |
| Polyethylene glycol | 0 to 10 |
| Octyl dimethyl glycine | 1 to 5 |
| Sodium hexadecyl diphenyloxide disulfonate | 0 to 1 |
| Secondary alcohol ethoxylate | 0 to 1.0 |
| Oleyl triethoxy monodiphosphate | 0 to 0.4 |
| EDTA | 0.05 to 0.20 |
| succinic acid | 5 to 8 |

A more preferred vehicle formulation for the yellow ink composition (Yellow Formula 2) is as follows:

TABLE II

| Component | Wt. % |
|---|---|
| Alkyl diol | 11 to 13 |
| Heterocyclic ketone | 4.0 to 5.5 |
| Polyethylene glycol | 3 to 4 |
| Octyl dimethyl glycine | 2 to 4 |
| Sodium hexadecyl diphenyloxide disulfonate | 0.2 to 0.6 |
| Secondary alcohol ethoxylate | 0.3 to 0.5 |
| Oleyl triethoxy monodiphosphate | 0.2 to 0.3 |
| EDTA | 0.10 to 0.15 |
| succinic acid | 5.5 to 6.5 |

Yellow Formula 2 possesses the following properties:

TABLE III

| Property | Parameters | Units | Specs LSL | Specs USL |
|---|---|---|---|---|
| Absorbance | @ 200 ppm | AU | 0.348 | 0.404 |
| Lambda Maximum | | nm | 404 | 412 |
| PH | @ 25° C. | pH | 3.7 | 4.1 |
| Color L, CIELab | @ Abs 1.00 | | 97 | 100 |
| Color a | | | −22 | −16 |
| Color b | | | 59 | 65 |

Magenta Ink

In order to finalize the magenta ink composition, various components were tested to select optimum concentration limits of components making up the magenta ink formulation of the ink set of the present invention in order to achieve low cost, as well as good performance and reliability.

The tested ink compositions were:

TABLE IV

| | Ink #1 | Ink #2 | Ink #3 | Ink #4 | Ink #5 |
|---|---|---|---|---|---|
| Absorbance @1:2000 dilution | 0.796 | 0.797 | 0.789 | 0.798 | 0.791 |
| Alkanediol | 15% | 15% | 15% | 15% | 15% |
| Polyethylene glycol | 3.30% | 3.30% | 3.30% | 3.50% | 2.00% |
| Octyl dimethyl Glycine | 4.29% | 3.50% | 3.80% | 3.80% | 3.50% |
| Dicarboxylic acid 1 | 6% | 6% | 0.9% | 0.9% | 1.80% |
| Dicarboxylic acid 2 | 0.00% | 0.00% | 4.6% | 4.6% | 3.80% |
| Secondary alcohol ethoxylate | 0.70% | 0.71% | 0.60% | 0.60% | 0.70% |
| Oleyl Triethoxy mono diphosphate | 0.40% | 0.40% | 0.40% | 0.40% | 0.40% |
| Sodium hexadecyl diphenyloxide disulfonate | 0.50% | 0.50% | 0.50% | 0.50% | 0.50% |
| Chelating agent | 0.100% | 0.100% | 0.127% | 0.127% | 0.127% |

The tested magenta ink formulations possess the following properties:

TABLE V

Magenta Candidates Optimization and Freeze Selection Results Summary Table

| | Ink #1 | Ink #2 | Ink #3 | Ink #4 | Ink #5 |
|---|---|---|---|---|---|
| Crusting performance at ambient | Acceptable | Acceptable − | Good | Good | Acceptable + |
| Crusting performance at cold/dry | Acceptable | Acceptable − | Good | Good | Acceptable |
| recoverability | Acceptable | Acceptable | V. Good | Acceptable | Acceptable |
| printing performance | Acceptable | Acceptable | Acceptable | Good | Acceptable |
| Kogation | Marginal | Marginal | Acceptable | Good | Marginal |
| Ink Stability | Pass | Pass | Pass | Pass | Pass |

TABLE V-continued

Magenta Candidates Optimization and Freeze Selection Results Summary Table

|  | Ink #1 | Ink #2 | Ink #3 | Ink #4 | Ink #5 |
|---|---|---|---|---|---|
| Cost | Expensive | Expensive | Least Costly | Least Costly | Less Costly |
| Comments | Rejected | Rejected | Runner up | Final Selection | Rejected |

Referring to Table V, it can be observed that all tested ink formulations passed the stability tests. Both ink #3 and ink #4 performed best with respect to crusting performance, as compared with the other formulations. Of significant importance in the selection criteria, ink #3 and ink #4 contain higher ratios of dicarboxylic acid # 1 and dicarboxylic acid #2, making them the lowest cost ink formulations in the group. Ink #4 should further reduce ink cost since it may require less cycle times to purify. Ink formulations tested for kogation had been in contact with IDS grease (Dow 3451). Ink #4 performed best among all inks in this regard. In view of these results, ink # 4 was selected as the ink formulation of choice for formulating the magenta ink for use in the present invention.

A preferred vehicle formulation for the magenta ink composition is as follows:

TABLE VI

| Component | Wt. % |
|---|---|
| alkyl diol | 8 to 16 |
| polyethylene glycol | 0 to 10 |
| heterocyclic ketone | 0 to 5 |
| octyl dimethyl glycine | 1 to 5 |
| Glutaric Acid | 0 to 2 |
| sodium hexadecyl diphenyloxide disulfonate | 0 to 1 |
| secondary alcohol ethoxylate | 0.2 to 1.0 |
| oleyl triethoxy monodiphosphate | 0.1 to 0.6 |
| EDTA | 0.05 to 0.20 |
| succinic acid | 4 to 8 |

A more preferred formulation for the magenta ink composition is as follows:

TABLE VII

| Component | Wt. % |
|---|---|
| Alkyl Diol | 14 to 16 |
| Polyethylene glycol | 3 to 4 |
| Octyl dimethyl glycine | 2.0 to 4.0 |
| Glutaric Acid | 0.7 to 1.1 |
| Sodium hexadecyl diphenyloxide disulfonate | 0.3 to 0.7 |
| Secondary alcohol ethoxylate | 0.5 to 0.7 |
| Oleyl triethoxy monodiphosphate | 0.3 to 0.5 |
| EDTA | 0.10 to 0.15 |
| succinic acid | 4 to 5 |

The more preferred magenta ink formulation possesses the following properties:

TABLE VIII

| Property | Parameters | Units | Specs LSL | Specs USL |
|---|---|---|---|---|
| Absorbance | @ 100 ppm | AU | 0.15 | 0.17 |
| Lambda Maximum |  | nm | 540 | 550 |
| pH | @ 25° C. | pH | 3.8 | 4.2 |
| Color L, CIELab | @ Abs 1.00 |  | 65 | 73 |
| Color a |  |  | 67 | 75 |
| Color b |  |  | −22 | −14 |

Cyan Ink

The cyan ink selected for use in the present inkjet color inkset of the present invention was based on inks used in inkjet printers (non-off axis systems) containing cyan dyes, such as Acid Blue 9 (AB9). In view of the foregoing, previously-known or slightly modified cyan ink formulations were employed.

A preferred vehicle formulation for the cyan ink composition is as follows:

TABLE IX

| Component | Wt. % |
|---|---|
| Alkyl diol | 8 to 16 |
| Heterocyclic ketone | 0 to 7 |
| Polyethylene glycol | 0 to 10 |
| Octyl dimethyl glycine | 1.5 to 5.0 |
| Sodium hexadecyl diphenoxide disulfonate | 0 to 1 |
| Secondary alcohol ethoxylate | 0.4 to 0.8 |
| Oleyl triethoxy monodiphosphate | 0.3 to 0.5 |
| EDTA | 0.10 to 0.14 |
| succinic acid | 4.5 to 6.5 |

The more preferred cyan ink formulation possesses the following properties:

TABLE X

| Property | Parameters | Units | Specs LSL | Specs USL |
|---|---|---|---|---|
| Absorbance | @ 200 ppm | AU | 0.335 | 0.400 |
| Lambda Maximum |  | nm | 624 | 632 |
| PH | @ 25° C. | pH | 3.8 | 4.2 |
| Color L, CIELab | @ Abs 1.00 |  | 79 | 85 |
| Color a |  |  | −38 | −32 |
| Color b |  |  | −31 | −25 |

Thus, there has been disclosed a dye set for formulating yellow, magenta, and cyan inks, the dye set comprising a yellow dye mixture of Acid Yellow 23 (AY23) and Direct Yellow 132 (DY 132); a magenta dye having the formula:

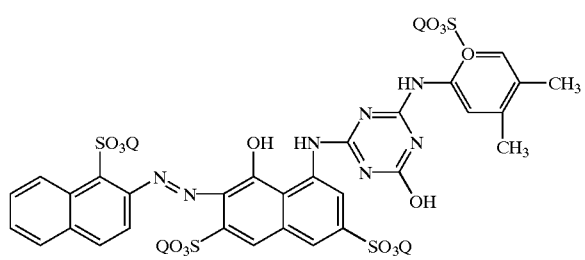

wherein Q is a cation; and
a cyan dye mixture comprising a compound having the formula:

—$(SO_3H)_{2.7}$

CuPc—$(SO_2NH_2)_{0.5}$

—$(SO_2NH(C_2H_4OH))_{0.8}$ wherein Pc represents a phthalocyanine nucleus and acid blue 9.

It will be readily apparent to those skilled in the art that various changes and modifications of an obvious nature may be made without departing from the spirit of the invention. All such changes and modifications are considered to fall within the scope of the invention as defined by the appended claims.

What is claimed is:

1. An ink set for use in an ink-jet printer, comprising
    a yellow ink comprising a mixture of Acid Yellow 23 (AY23) and Direct Yellow 132 (DY132); a
    a cyan ink comprising a mixture of Acid Blue 9 (AB9) and a cyan dye compound having the formula:

—$(SO_3H)_{2.7}$

CuPc—$(SO_2NH_2)_{0.5}$

—$(SO_2NH(C_2H_4 OH))_{0.8}$ wherein Pc represents a phthalocyanine nucleus; and
    a magenta ink comprising a dye having the formula:

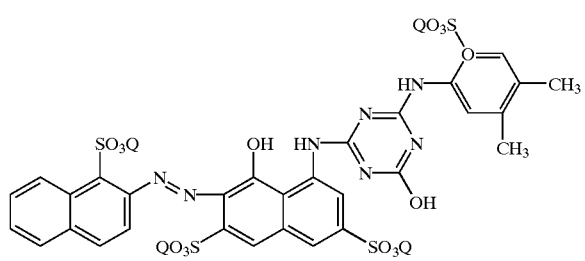

wherein Q is a cation.

2. The ink set of claim 1, wherein said yellow ink further comprises 8 to 16 wt % of an alkyl diol, 0 to 6 wt % of a heterocyclic ketone, and from 0 to 10 wt % of a polyethylene glycol.

3. The ink set of claim 1, wherein said magenta ink further comprises 8 to 16 wt % of an alkyl diol and from 0 to 10 wt % of a polyethylene glycol.

4. The ink set of claim 1, wherein said cyan ink further comprises 8 tod 16 wt % of an alkyl diol, 0 to 7 wt % of a heterocyclic ketone, and from 0 to 10 wt % of a polyethylene glycol.

5. The ink set of claim 1, wherein each of said cyan, yellow, and magenta inks comprises from about 0.05 to about 20% dye.

6. The ink set of claim 1, wherein each of said cyan, yellow, and magenta inks comprises from about 0.1 to about 8% dye.

7. The ink set of claim 1, wherein each of said cyan, yellow, and magenta inks comprises from about 0.5 to about 6% dye.

8. The ink set of claim 1, wherein said yellow ink further comprises from about 5.5 to about 6.0 wt % of succinic acid.

9. The ink set of claim 1, wherein each of said cyan, yellow, and magenta inks has a pH of from about 3.5 to about 4.2.

10. A set of inks containing yellow, magenta, and cyan dyes for ink-jet printing, said set of inks comprising:
    at least one yellow ink containing at least one yellow colorant comprising a mixture of Acid Yellow 23 (AY23) and Direct Yellow 132 (DY132), at least one yellow colorant having a visible light absorbance of from about 0.242 to about 0.620 at a lambda$_{max}$ of from 404 to 412 and at a 1:5,000 dilution in water;
    at least one cyan ink containing at least one cyan colorant comprising a mixture of Acid Blue 9 (AB9) and a cyan dye compound having the formula:

—$(SO_3H)_{2.7}$

CuPc—$(SO_2NH_2)_{0.5}$

—$(SO_2NH(C_2H_4OH))_{0.8}$ wherein Pc represents a phthalocyanine nucleus, the at least one cyan colorant having a visible light absorbance of from about 0.08 to about 1.55at a lambda$_{max}$ of from 624 to 632 and at a 1:5,000 dilution in water;
    at least one magenta ink containing at least one magenta colorant comprising a dye compound having formula (II):

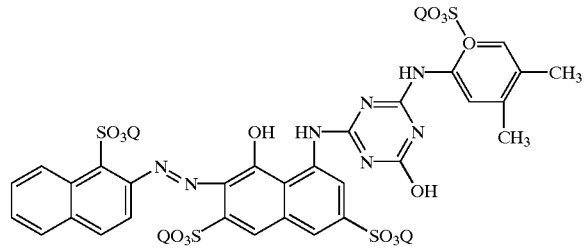

wherein Q is a cation, the at least one magenta colorant having a visible light absorbance of from about 0.020 to about 0.807 at a lambda$_{max}$ of from 540 to 550 and at a 1:10,000 dilution in water.

11. The set of inks of claim 10, wherein the at least one yellow colorant has a visible light absorbance of from about 0.299 to about 0.451, the at least one cyan colorant has a visible light absorbance of from about 0.160 to about 0.800, and the at least one magenta colorant has a visible light absorbance of from about 0.061 to about 0.404.

12. The set of inks of claim 10, wherein the at least one yellow colorant has a visible light absorbance of from about 0.348 to about 0.404, the at least one cyan colorant has a visible light absorbance of from about 0.335 to about 0.400, and the at least one magenta colorant has a visible light absorbance of from about 0.150 to about 0.170.

13. The ink set of claim 10, wherein each of said cyan, yellow, and magenta inks comprises from about 0.5 to about 6% dye.

14. The ink set of claim 10, wherein each of said cyan, yellow, and magenta inks has a pH of from about 3.5 to about 4.2.

15. The ink set of claim 10, wherein each of said cyan, yellow, and magenta inks further comprises 8 to 16 wt % of an alkyl diol, 0 to 7 wt % of a heterocyclic ketone and from 0 to 10 wt % of a polyethylene glycol.

16. A method for printing using an ink-jet printer, comprising printing from a set of ink-jet inks onto a printing medium, said ink set comprising:

providing at least one yellow ink containing at least one yellow colorant comprising a mixture of Direct Yellow 132 (DY132) and Acid Yellow 23 (AY23), the at least one yellow colorant having a visible light absorbance of from about 0.242 to about 0.620 at a $lambda_{max}$ of from 404 to 412 and at a 1:5,000 dilution in water;

providing at least one cyan ink containing at least one cyan colorant comprising a mixture of Acid Blue 9 (AB9) and a cyan dye compound having the formula:

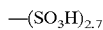

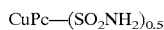

wherein Pc represents a phthalocyanine nucleus, the at least one cyan colorant having a visible light absorbance of from about 0.08 to about 1.55 at a $lambda_{max}$ of from 624 to 632 and at a 1:5,000 dilution in water;

providing at least one magenta ink containing at least one magenta colorant comprising a dye compound having formula (II):

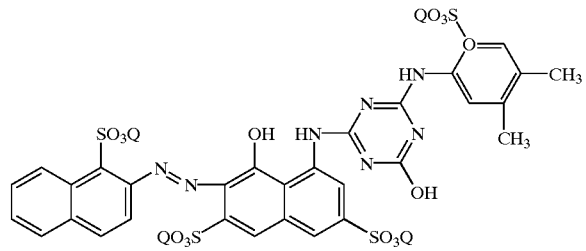

wherein Q is a cation, the at least one magenta colorant having a visible light absorbance of from about 0.020 to about 0.807 at a $lambda_{max}$ of from 540 to 550 and at a 1:10,000 dilution in water.

17. The method of claim 16, wherein the at least one yellow colorant has a visible light absorbance of from about 0.299 to about 0.451, the at least one cyan colorant has a visible light absorbance of from about 0.160 to about 0.800, and the at least one magenta colorant has a visible light absorbance of from about 0.061 to about 0.404.

18. The method of claim 16, wherein the at least one yellow colorant has a visible light absorbance of from about 0.348 to about 0.404, the at least one cyan colorant has a visible light absorbance of from about 0.335 to about 0.400, and the at least one magenta colorant has a visible light absorbance of from about 0.150 to about 0.170.

* * * * *

UNITED STATES PATENT AND TRADEMARK OFFICE
CERTIFICATE OF CORRECTION

PATENT NO.    : 6,540,821 B2
DATED         : April 1, 2003
INVENTOR(S)   : Adamic et al.

It is certified that error appears in the above-identified patent and that said Letters Patent is hereby corrected as shown below:

<u>Column 13,</u>
Line 65, delete "tod" and insert therefor -- to --.

Signed and Sealed this

Twenty-seventh Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,540,821 B2
DATED : April 1, 2003
INVENTOR(S) : Ramond J. Adamic et al.

It is certified that error appears in the above-identified patent and that said Letters Patent is hereby corrected as shown below:

Title page,
Item [57], ABSTRACT, replace the second formula shown in the ABSTRACT with the following:

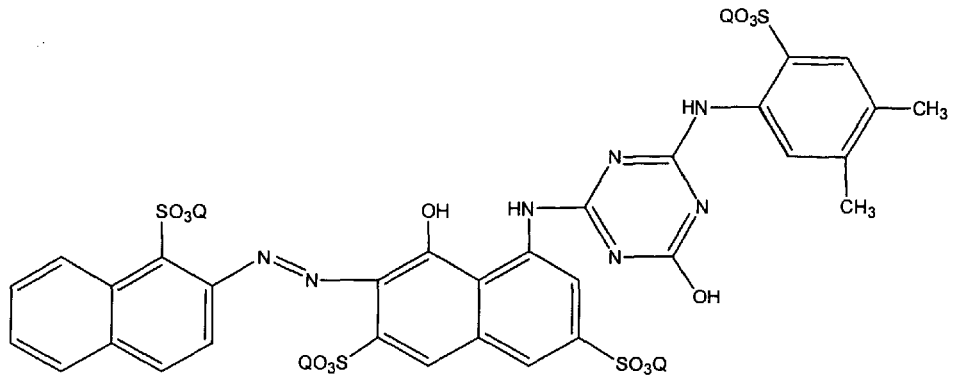

Column 4,
Lines 10-20, replace the formula with the following:

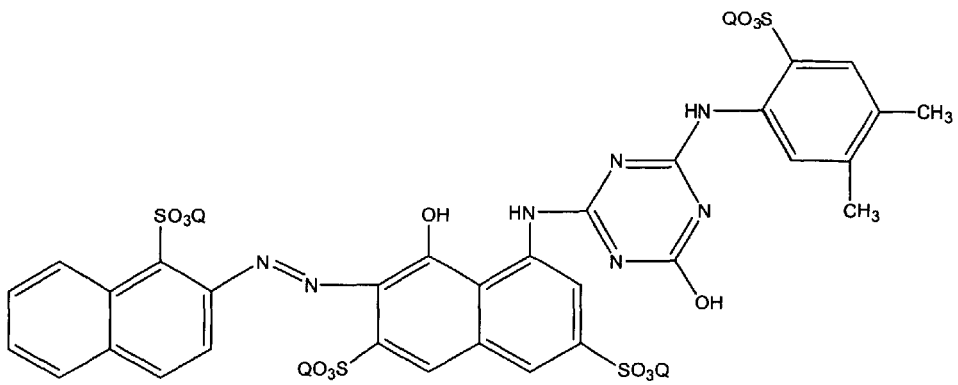

UNITED STATES PATENT AND TRADEMARK OFFICE
CERTIFICATE OF CORRECTION

PATENT NO. : 6,540,821 B2
DATED : April 1, 2003
INVENTOR(S) : Ramond J. Adamic et al.

It is certified that error appears in the above-identified patent and that said Letters Patent is hereby corrected as shown below:

<u>Column 5,</u>
Lines 45-55, replace the formula with the following:

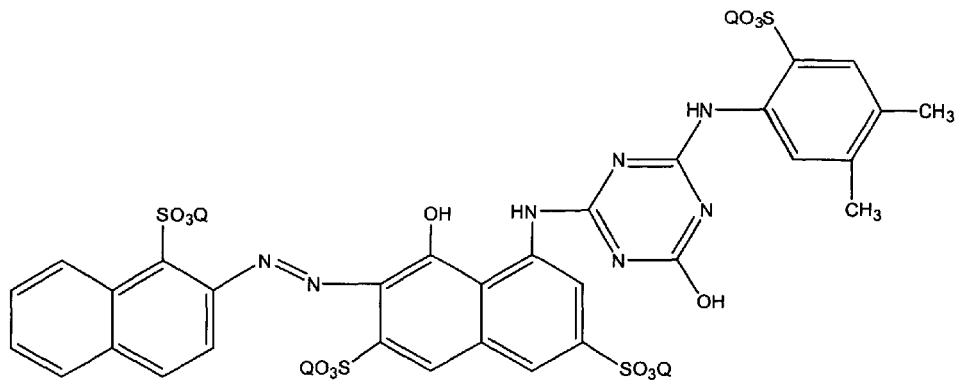

<u>Column 13,</u>
Lines 1-10 and 45-55, replace the formula with the following:

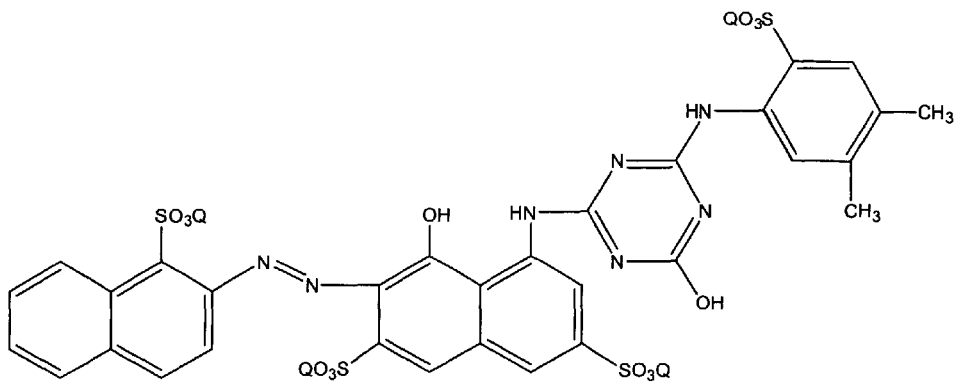

UNITED STATES PATENT AND TRADEMARK OFFICE
CERTIFICATE OF CORRECTION

PATENT NO. : 6,540,821 B2
DATED : April 1, 2003
INVENTOR(S) : Ramond J. Adamic et al.

It is certified that error appears in the above-identified patent and that said Letters Patent is hereby corrected as shown below:

Column 13 (cont'd),
Lines 45-55, replace the formula with the following:

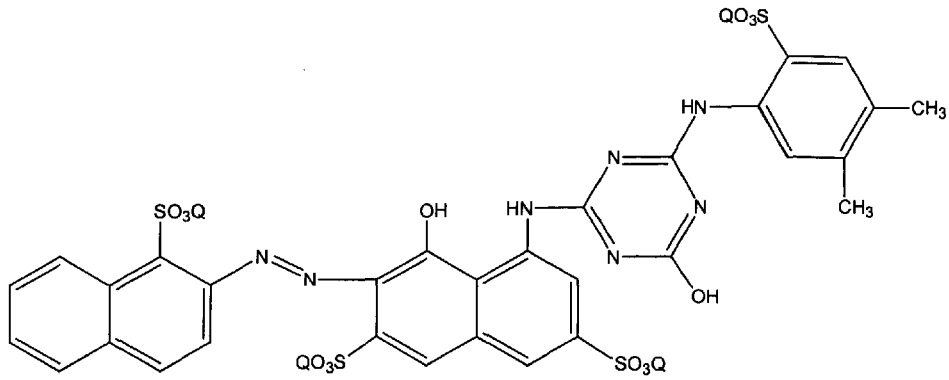

Column 14,
Lines 40-50, replace the formula with the following:

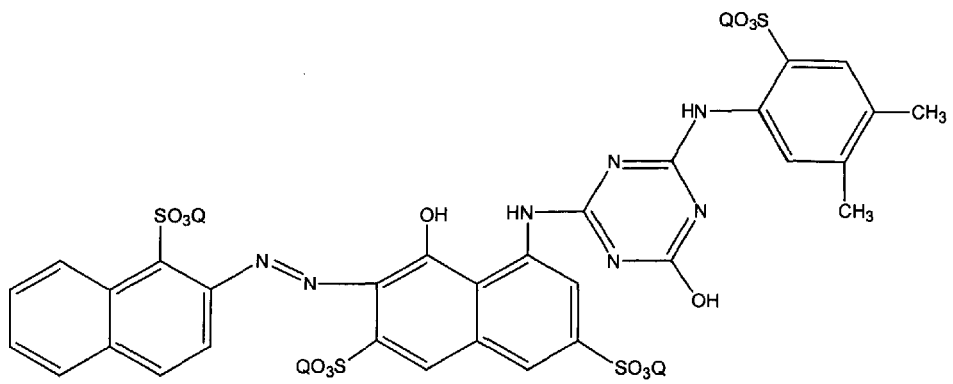

UNITED STATES PATENT AND TRADEMARK OFFICE
CERTIFICATE OF CORRECTION

PATENT NO. : 6,540,821 B2
DATED : April 1, 2003
INVENTOR(S) : Ramond J. Adamic et al.

It is certified that error appears in the above-identified patent and that said Letters Patent is hereby corrected as shown below:

Column 14,
Lines 40-50, replace the formula with the following:

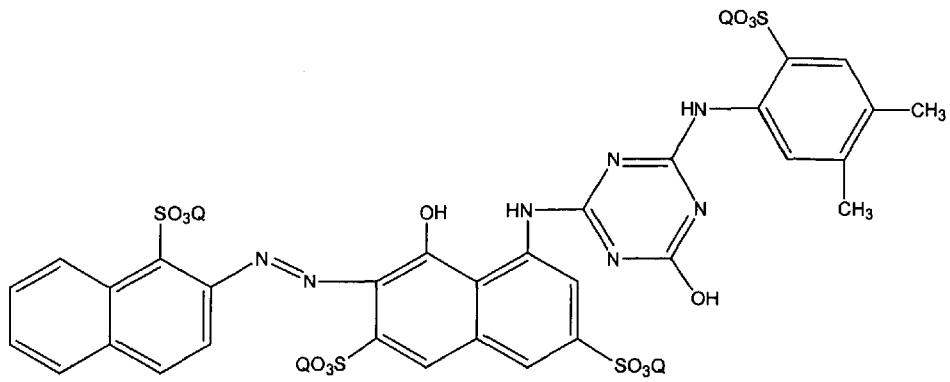

Signed and Sealed this

Thirteenth Day of January, 2005

JON W. DUDAS
*Director of the United States Patent and Trademark Office*